(12) United States Patent
Son

(10) Patent No.: US 7,535,917 B1
(45) Date of Patent: May 19, 2009

(54) MULTI-PROTOCOL NETWORK ADAPTER

(75) Inventor: Keith Son, Hayward, CA (US)

(73) Assignee: Netapp, Inc., Sunnyvale, CA (US)

( * ) Notice: Subject to any disclaimer, the term of this patent is extended or adjusted under 35 U.S.C. 154(b) by 616 days.

(21) Appl. No.: 11/064,345

(22) Filed: Feb. 22, 2005

(51) Int. Cl.
*H04L 12/28* (2006.01)

(52) U.S. Cl. ........................................ 370/419; 370/469

(58) Field of Classification Search ................ None
See application file for complete search history.

(56) References Cited

U.S. PATENT DOCUMENTS

| | | | |
|---|---|---|---|
| 4,929,939 A | 5/1990 | Varma | |
| 5,124,987 A | 6/1992 | Mulligan | |
| 5,539,736 A * | 7/1996 | Johnson et al. | 370/402 |
| 5,936,966 A * | 8/1999 | Ogawa et al. | 370/469 |
| 6,076,115 A | 6/2000 | Sambamurthy et al. | |
| 6,148,414 A | 11/2000 | Brown | |
| 6,337,847 B1 * | 1/2002 | Vitaloni | 370/217 |
| 6,400,730 B1 | 6/2002 | Latif et al. | |
| 6,480,489 B1 * | 11/2002 | Muller et al. | 370/389 |
| 6,546,014 B1 | 4/2003 | Kramer | |
| 6,658,009 B1 | 12/2003 | Yamashita | |
| 6,718,139 B1 | 4/2004 | Finan | |
| 6,792,507 B2 | 9/2004 | Chiou | |
| 6,876,656 B2 * | 4/2005 | Brewer et al. | 370/392 |
| 6,985,956 B2 | 1/2006 | Luke et al. | |
| 7,031,343 B1 | 4/2006 | Kuo | |
| 7,031,904 B1 * | 4/2006 | Wilson et al. | 709/230 |
| 7,089,293 B2 | 8/2006 | Grosner | |
| 7,180,909 B1 * | 2/2007 | Achler | 370/466 |
| 7,239,642 B1 * | 7/2007 | Chinn et al. | 370/401 |
| 7,289,499 B1 * | 10/2007 | Chinn et al. | 370/389 |
| 2001/0050914 A1 * | 12/2001 | Akahane et al. | 370/382 |
| 2002/0154633 A1 * | 10/2002 | Shin et al. | 370/389 |
| 2002/0184394 A1 * | 12/2002 | Athanas et al. | 709/250 |
| 2003/0023795 A1 * | 1/2003 | Packwood et al. | 710/105 |
| 2003/0084219 A1 * | 5/2003 | Yao et al. | 710/300 |
| 2003/0093567 A1 * | 5/2003 | Lolayekar et al. | 709/246 |

(Continued)

OTHER PUBLICATIONS

Eytan Modiano, et al., "A Novel Medium Access Control Protocol for WDM-Based LAN's and Access Networks Using a Master/Slave Scheduler", Journal of Lightwave Technology, vol. 18, No. 4, Apr. 2000, pp. 461-468.

(Continued)

*Primary Examiner*—Edan Orgad
*Assistant Examiner*—Timothy J Weidner
(74) *Attorney, Agent, or Firm*—Perkins Coie LLP

(57) ABSTRACT

Storage and network data can be received from one network using a multi-protocol network adapter. In one embodiment, such a multi-protocol network adapter includes a port to receive a serialized data stream, the serialized data stream including traffic data encoded using a traffic protocol and storage data encoded using a storage protocol and a receiver coupled to the port to de-serialize the received data stream. A physical layer frame extracted from the de-serialized data stream can be stored in an input buffer. The multi-protocol network adapter can also include a protocol identifier coupled to the input buffer to determine whether the physical layer frame was encoded using the traffic or the storage protocol, and a storage decoder coupled to the protocol identifier to decode the physical layer frame using the storage protocol if the physical layer frame is determined to have been encoded using the storage protocol by the protocol identifier.

22 Claims, 4 Drawing Sheets

U.S. PATENT DOCUMENTS

2003/0189935 A1    10/2003    Warden et al.
2004/0165588 A1*    8/2004    Pandya ........................ 370/389
2004/0233910 A1*   11/2004    Chen et al. ............... 370/395.5
2004/0258058 A1*   12/2004    Heston et al. ................ 370/389
2005/0228903 A1*   10/2005    Lerner et al. ................ 709/250
2008/0028096 A1*    1/2008    Henderson et al. .......... 709/236

OTHER PUBLICATIONS

Mounir Hamdi, et al., "Scalable High-Speed Switches/Routers with QoS Support", IEEE Communications Magazine, Dec. 2000, pp. 61-69.

Kramer et al. "Ethernet PON (ePON): Design and Analysis of an Optical Access Network," University of California, pp. 1-25, Aug. 2000.

* cited by examiner

MULTI-PROTOCOL NETWORK ADAPTER

FIELD OF THE INVENTION

At least one embodiment of the present invention pertains to data storage techniques, and more particularly, to a multi-protocol network adapter.

BACKGROUND

A file server is a type of storage server that operates on behalf of one or more clients to store and manage shared files in a set of mass storage devices, such as magnetic or optical storage based disks. The mass storage devices are typically organized as one or more groups of Redundant Array of Independent (or Inexpensive) Disks (RAID). One configuration in which file servers can be used is a network attached storage (NAS) configuration. In a NAS configuration, a file server can be implemented in the form of an appliance that attaches to a network, such as a local area network (LAN) or a corporate intranet. Examples of such an appliance include any of the NetApp Filer® products made by Network Appliance, Inc. in Sunnyvale, Calif., or the SpinServer® products formerly made by Spinnaker Networks, Inc., which was acquired by Network Appliance.

File servers usually use storage-optimized protocols to move data between the file server and the storage medium. One such protocol in the Fibre Channel specification network coupled with a small computer system interface (SCSI) protocol stack. File servers are also connected to traffic networks via some traffic protocol, such as Ethernet and transmission control protocol/Internet protocol (TCP/IP) stack. Traditionally, the file server thus included two network adapters to be able to connect to two separate networks: a storage network and a traffic network (e.g., a Fibre Channel network and an Ethernet network). Alternatively, the file server included a dual-port network adapter, where each port is associated with a protocol and a separate transmit and receive chain, in effect being two network adapters on a single card.

This two-network two-adapter setup has various disadvantages, including the expense associated with building and maintaining two redundant networks and using two network adapters in each device connected to the two networks. Therefore it would be advantageous to have a multi-protocol network adapter that can receive data over a single network regardless of protocol.

SUMMARY OF THE INVENTION

Storage and network data can be received from one network using a multi-protocol network adapter. In one embodiment, such a multi-protocol network adapter includes a port to receive a serialized data stream, the serialized data stream including traffic data encoded using a traffic protocol and storage data encoded using a storage protocol and a receiver coupled to the port to de-serialize the received data stream. A physical layer frame extracted from the de-serialized data stream can be stored in an input buffer. The multi-protocol network adapter can also include a protocol identifier coupled to the input buffer to determine whether the physical layer frame was encoded using the traffic or the storage protocol, and a storage decoder coupled to the protocol identifier to decode the physical layer frame using the storage protocol if the physical layer frame is determined to have been encoded using the storage protocol by the protocol identifier.

BRIEF DESCRIPTION OF THE DRAWINGS

One or more embodiments of the present invention are illustrated by way of example and not limitation in the figures of the accompanying drawings, in which like references indicate similar elements and in which.

DETAILED DESCRIPTION

Figure 1:
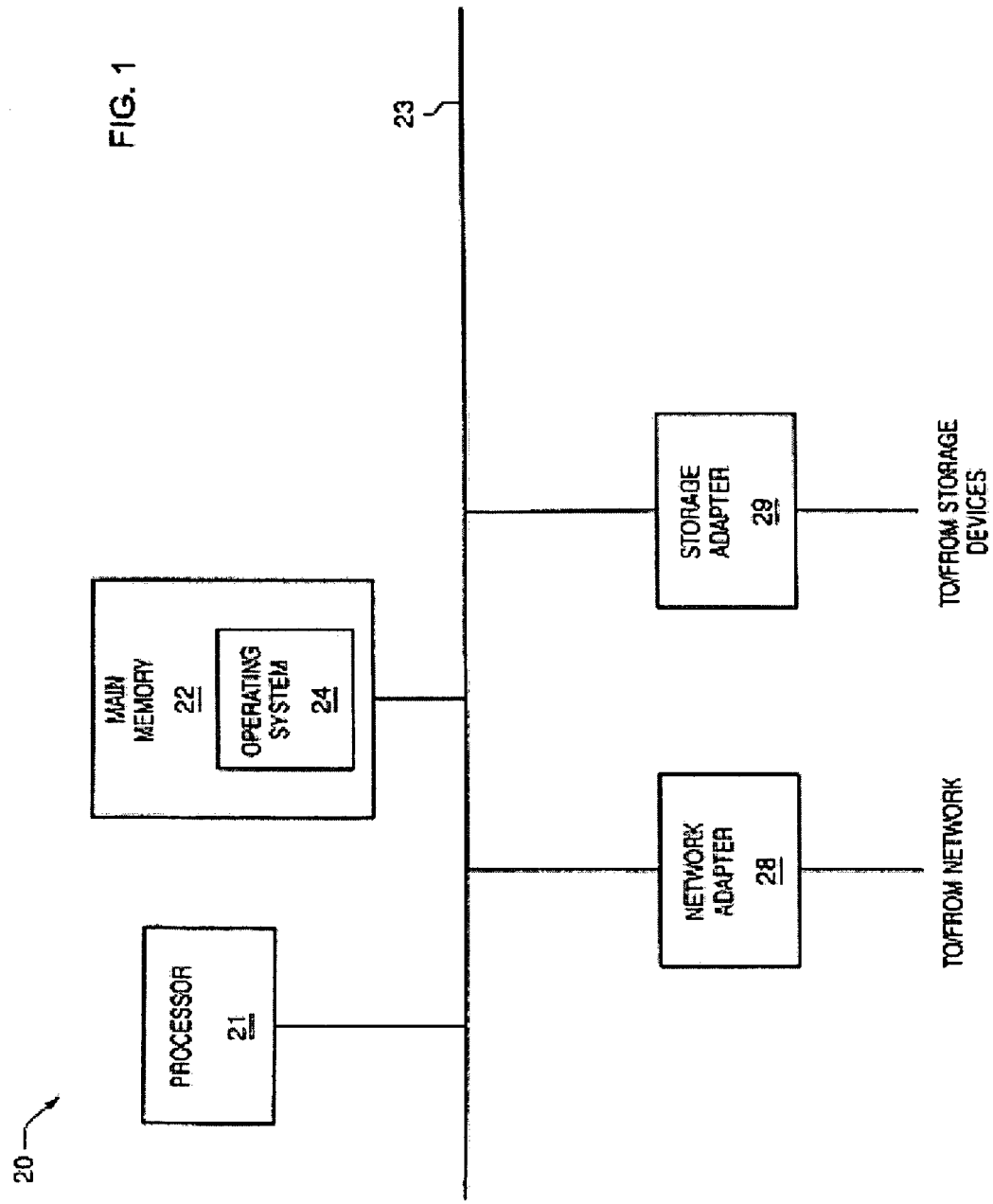
FIG. 1 is a block diagram illustrating a storage server that can be improved using embodiments of the present invention.

A method and apparatus for interfacing with a network is described. Note that in this description, references to "one embodiment" or "an embodiment" mean that the feature being discussed is included in at least one embodiment of the present invention. Further, separate references to "one embodiment" or "an embodiment" in this description do not necessarily refer to the same embodiment; however, such embodiments are also not mutually exclusive unless so stated, and except as will be readily apparent to those skilled in the art from the description. For example, a feature, structure, act, etc. described in one embodiment may also be included in other embodiments. Thus, the present invention can include a variety of combinations and/or integrations of the embodiments described herein.

Some portions of the detailed description that follows are presented in terms of algorithms and symbolic representations of operations on data within a computer memory. These algorithmic descriptions and representations are the means used by those of ordinary skill in the arts to most effectively convey the substance of their work to each other. An algorithm is here, and generally, conceived to be a self-consistent sequence of steps leading to a desired result. The steps are those requiring physical manipulations of physical quantities. Usually, though not necessarily, these quantities take the form of electrical or magnetic signals capable of being stored, transferred, combined, compared and otherwise manipulated. It has proven convenient at times, principally for reasons of common usage, to refer to these signals as bits, values, elements, symbols, characters, terms, numbers or the like. It should be borne in mind, however, that all of these and similar terms are to be associated with the appropriate physical quantities and are merely convenient labels applied to these quantities. Unless specifically stated otherwise, it will be appreciated that throughout the description of the present invention, use of terms such as "processing", "computing", "calculating", "determining", "displaying" or the like, refer to the action and processes of a computer system, or similar electronic computing device, that manipulates and transforms data represented as physical (electronic) quantities within the computer system's registers and memories into other data similarly represented as physical quantities within the computer system memories or registers or other such information storage, transmission or display devices.

As indicated above, one embodiment of the present invention is instantiated in computer software, that is, computer readable instructions, which, when executed by one or more computer processors/systems, instruct the processors/systems to perform the designated actions. Such computer software may be resident in one or more computer readable media, such as hard drives, CD-ROMs, DVD-ROMs, read-only memory, read-write memory and so on. Such software may be distributed on one or more of these media, or may be made available for download across one or more computer networks (e.g., the Internet). Regardless of the format, the computer programming, rendering and processing techniques discussed herein are simply examples of the types of programming, rendering and processing techniques that may be used to implement aspects of the present invention. These examples should in no way limit the present invention, which is best understood with reference to the claims that follow this description.

Before describing various embodiments of the multi-protocol network adapter, the context of network adapters, storage servers, and storage networks is described to ease understanding of the description of the various embodiments of the present invention. FIG. 1 shows the architecture of a storage server 20. Note that certain standard and well-known components which are not germane to the present invention are not shown. The server 20 includes a processor 21 and main memory 22, coupled together by a bus system 23. The bus system 23 in FIG. 1 is an abstraction that represents any one or more separate physical buses and/or point-to-point connections, connected by appropriate bridges, adapters and/or controllers. The bus system 23, therefore, may include, for example, a system bus, a Peripheral Component Interconnect (PCI) bus, a HyperTransport or industry standard architecture (ISA) bus, a small computer system interface (SCSI) bus, a universal serial bus (USB), or an Institute of Electrical and Electronics Engineers (IEEE) standard 1394 bus (sometimes referred to as "Firewire").

The processor 21 is the central processing unit (CPU) of the server 20 and, thus, controls the overall operation of the server 20. In certain embodiments, the processor 21 accomplishes this by executing software stored in main memory 22. The processor 21 may be, or may include, one or more programmable general-purpose or special-purpose microprocessors, digital signal processors (DSPs), programmable controllers, application specific integrated circuits (ASICs), programmable logic devices (PLDs), or the like, or a combination of such devices. In one embodiment, the storage server 20 has two processors or more processors that may be dedicated to process network and storage access respectively.

In yet other embodiments, the functionality of the storage server 20 is divided into two separate devices, each having a separate processor. For example one such device can handle the network interface data while another device can handle the storage interface data. Such devices having the functionality of part of a storage server are sometimes referred to as blades. For example a network blade can handle client side processing and a storage blade can handle storage side processing.

The main memory 22, which is generally some form of random access memory (RAM), stores the operating system 24 of the server 20. Also connected to the processor 21 through the bus system 23 are a network adapter 28 and a storage adapter 29. The network adapter 28 provides the server 20 with the ability to communicate with remote devices, such as clients and/or another storage or manager server, over a network and may be, for example, an Ethernet adapter. The storage adapter 29 allows the filer to access the external mass storage devices and may be, for example, a Fibre Channel adapter or SCSI adapter. In one embodiment, the present invention eliminates the need for two separate adapters interfacing with two separate networks as shown in FIG. 1.

Figure 2:
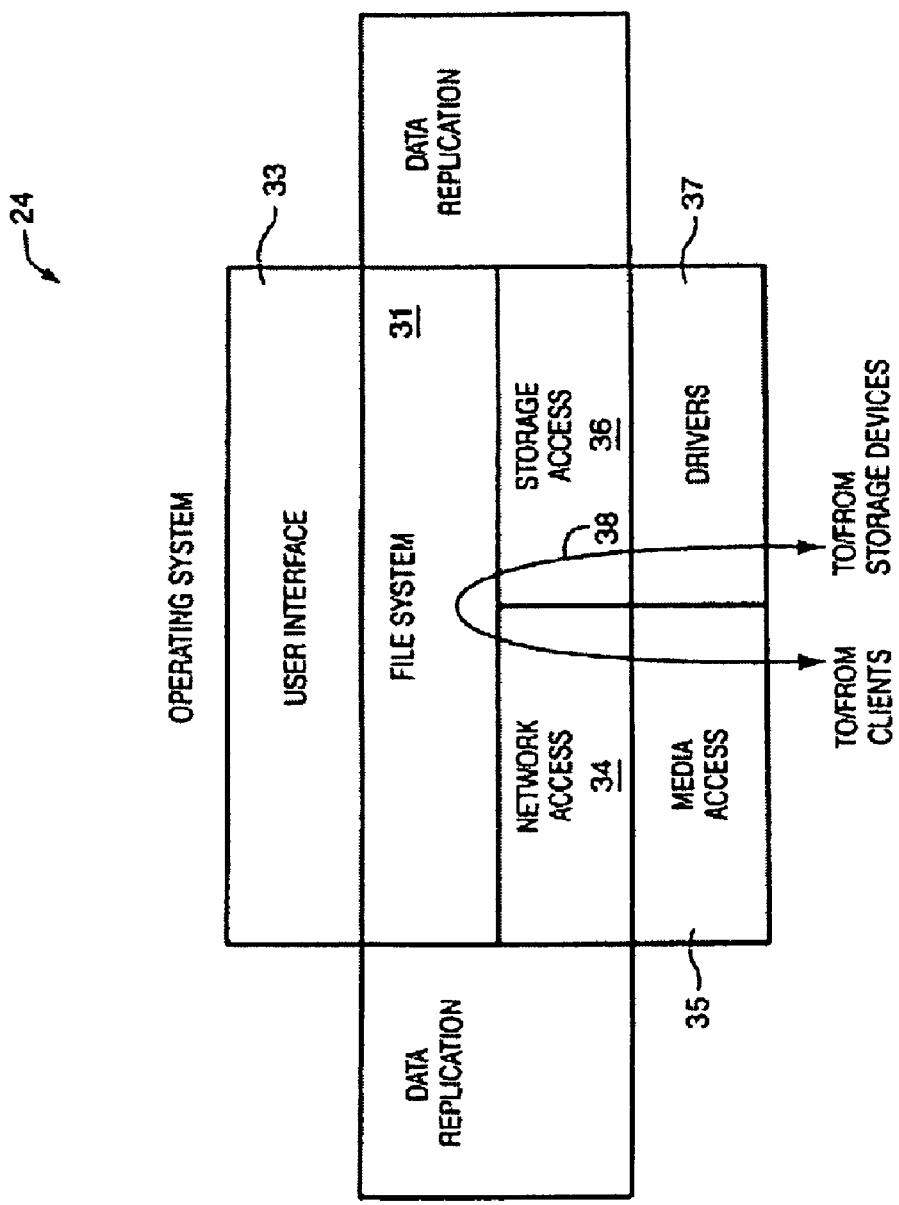
FIG. 2 is a block diagram illustrating an operating system of a storage server according to one embodiment of the present invention.

FIG. 2 illustrates the operating system 24 of the server 20, according to certain embodiments of the invention. As can be seen, the operating system 24 includes a number of layers. The core of the operating system 24 is the file system 31 which, among other responsibilities, executes read and write operations on the mass storage devices in response to client requests, maintains directories, and manages consistency point operations. An example of a file system suitable for this purpose is the Write Anywhere File Layout (WAFL®) file system from Network Appliance®, such as used in the NetApp Filers. The file system 31 operates on blocks of data of a predetermined size, such as 4 kbytes. Also shown in FIG. 2 is the logical data path 38 from clients to mass storage devices, through the file system 31.

Above the file system 31, the operating system 24 also includes a user interface 33, through which a network administrator or other user can control and/or configure the filer (e.g., remotely from a management station). The user interface 33 may generate a command line interface and/or a graphical user interface for this purpose.

Below the file system 31, on the client side the operating system 24 includes a network layer 34 and, at the lowest level, a media access layer 35. The network access layer 34 implements any of various protocols used to communicate with client devices, such as network file system (NFS), common Internet file system (CIFS) and/or hypertext transport protocol (HTTP). The media access layer 35 includes one or more drivers which implements the protocols used to communicate over the network, such as Ethernet.

Below the file system 31 on the storage device side, the operating system 24 includes a storage access layer 36 and, at the lowest level, a driver layer 37. The storage access layer 36 implements a disk storage protocol such as RAID, while the driver layer 37 implements a lower-level storage device access protocol, such as Fibre Channel or SCSI.

With reference again to FIG. 1, the storage server described above has a network adapter 28 and a storage adapter 29 which access a traffic network and a storage network respectively. However, in one embodiment of the present invention, the network adapter 28 and the storage adapter 29 can be replaced by a multi-protocol network adapter that can handle traffic and storage protocols on the same physical network.

Figure 3:
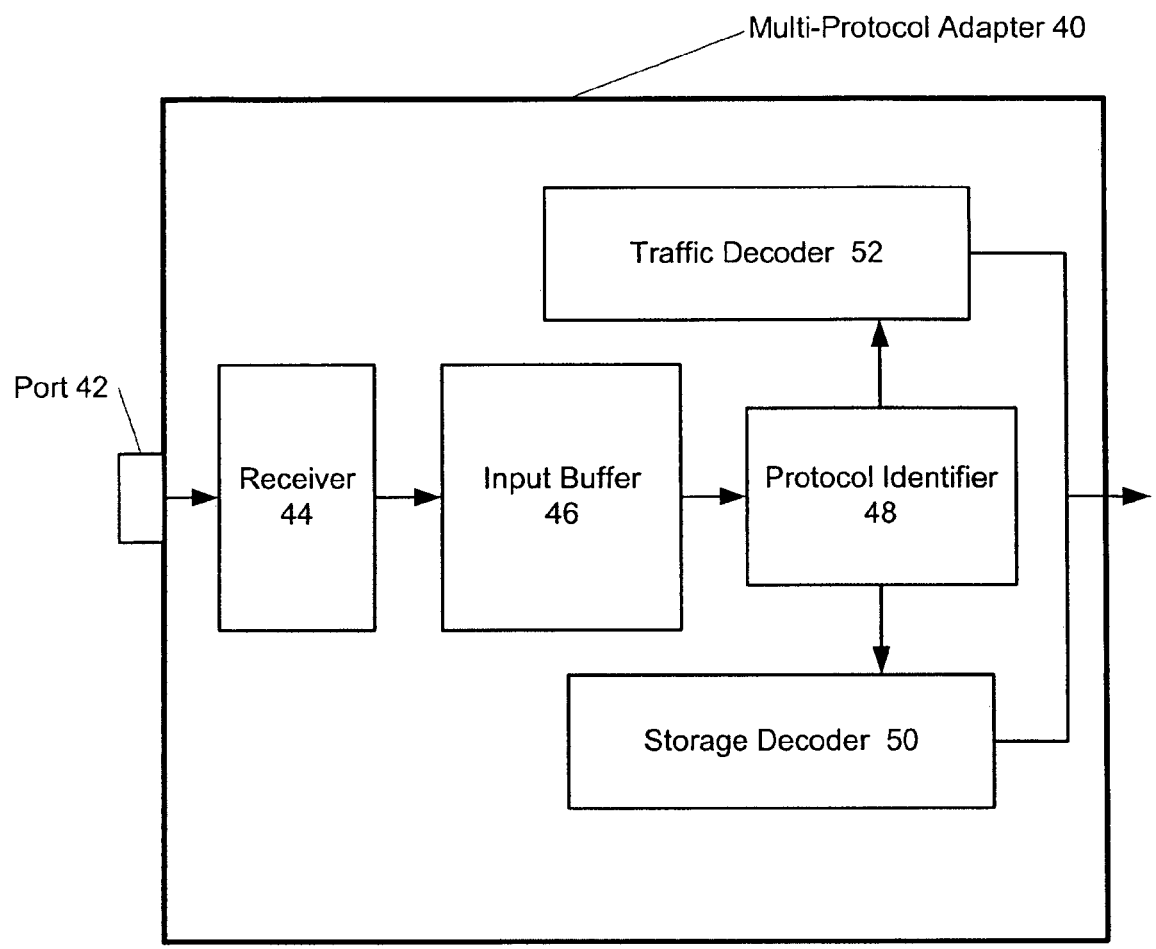
FIG. 3 is a block diagram illustrating a network adapter according to one embodiment of the present invention.

One embodiment of such a multi-protocol network adapter is now described with reference to FIG. 3. For convenience and to avoid cluttering the drawing, FIG. 3 only shows the receive chain of the multi-protocol network adapter 40. The multi-protocol network adapter 40 in FIG. 3 has one port 42—in one embodiment—to connect a device, such as a storage server, to a network.

In other embodiments, multiple ports can attach the multi-protocol network adapter to the same network to increase bandwidth. In one embodiment, if multiple ports are used, the multiple ports would not organize the received data stream into separate receive chains based on protocol.

The network that the port 42 is coupled with may be any type of serialized data network, e.g. coaxial cable or optical fiber. In one embodiment, this network is used to transmit both traffic data—regular message exchange and communication between various electronic devices—and storage data.

In one embodiment, serialized data received on the port 42 is provided to a receiver 44. In one embodiment, in which the physical network is a 10 Gigabit Ethernet the receiver 44 is implemented as a XAUI interface. For the XAUI (pronounced "Zowie") interface, the "AUI" portion is borrowed from the Ethernet Attachment Unit Interface, and the "X" represents the Roman numeral for ten and implies ten gigabits per second.

The receiver 44 demultiplexes the received data channels and de-serializes the incoming data, thereby organizing the received data into fixed-size blocks. In one embodiment, these blocks are 32-bit block, a unit generally referred to in computer science as a dword.

In one embodiment, the de-serialized data blocks are deposited into an input buffer 46 connected to the receiver 44. In one embodiment, the 32-bit dwords are stored in an input buffer 46 consisting of a 32-bit low latency FIFO registers. The data blocks in the input buffer 46 are logically organized into physical layer (PHY-layer) frames. The physical layer frames are protocol-specific. For example a 10 Gigabit Ethernet frame will have a different end of frame (EOF) indicator than a Fibre Channel frame.

In one embodiment, before the each physical layer frame in the input buffer 46 is decoded, it is passed to a protocol identifier 48. In one embodiment, the protocol identifier 48 identifies the protocol that was used to encode the received physical layer frame. Since the network to which some device is connecting via the multi-protocol network adapter 40 can be used for the transmission of data encoded in a number of protocols—such as TCP/IP or SCSI—prior to decoding, the physical layer frames can be classified according to protocol. In one embodiment, illustrated in FIG. 3, the protocol identifier 48 determines whether the received physical layer frame should be decoded using a traffic or a storage protocol. The protocol identifier 48 can do this by identifying the protocol used to encode the physical level frame.

In one embodiment, the protocol identifier 48 performs protocol identification by looking at one or more primitives unique to certain protocols. Primitives are standard header contents for physical level frames, such as beginning of frame, end of frame, and similar known bit-patterns that are part of the protocol overhead as opposed to data payload. In one embodiment, the protocol identifier 48 has access to a primitives database (not necessarily implemented as a database) storing primitives of each protocol associated with the multi-protocol network adapter 40.

For example, such a primitives database could include the beginning of frame (BOF) primitive for the 10 Gigabit Ethernet and the 10 Gigabit Fibre Channel standards. Then, the protocol identifier could search the physical layer frame for the BOF primitive, and compare it to the known primitives of the two standards. If the header of the physical layer frame matches the Fibre Channel BOF primitive, then the protocol needed to decode the physical layer frame is the SCSI protocol stack. However, if the header of the physical layer frame matches the Gigabit Ethernet BOF primitive, then the protocol needed to decode the physical layer frame is the TCP/IP protocol stack.

There are numerous other ways to implement the protocol identifier 48. For example, the protocol identifier 48 can be implemented as a high-speed Walsh-Hadamard decoder. There are various headers and primitives that can be used for comparison. The number of primitives compared also depends on the number of protocols handled by the multi-protocol network adapter 40. The adapter 40 shown in FIG. 3 only needs to distinguish between a traffic and a storage protocol. However, other embodiments of the invention are able to distinguish between any number of different protocols using similar methods and architectures as those described with reference to FIG. 3.

Once the protocol identifier 48 identifies the protocol associated with the physical layer frame as either a traffic protocol or a storage protocol, the protocol identifier 48 forwards the physical layer frame to an appropriate decoder based on the identified protocol. In one embodiment, the multi-protocol network adapter 40 includes or has access to both a storage decoder 50 and a traffic decoder 52. If the protocol identifier 48 identifies that a received physical layer frame was encoded using a storage protocol, then the storage decoder 50 is used to decode the physical layer frame. Conversely, if the protocol identifier 48 identifies that a received physical layer frame was encoded using a traffic protocol, then the traffic decoder 52 is used to decode the physical layer frame.

In another embodiment, the network adapter 40 does not contain the decoders on board. Instead, the protocol identifier 48 labels the physical layer frame according to protocol to be decoded by the device using the adapter 40 with the appropriate protocol stack based on the label. In the two-protocol example above, a single bit flag may be used to indicate whether the next physical layer frame was encoded using the traffic or the storage protocol and which decode protocol stack to use.

In another embodiment, the protocol classification provided by the protocol identifier is also used to determine the proper data path 38 through the file system 31. For example, if an incoming physical layer frame is identified as a traffic frame, then the media access 35 and network access 34 modules of the operating system 24 are activated to decode and process the data extracted from the physical layer frame. Conversely, if an incoming physical layer frame is identified as a storage frame, then the drivers 37 and storage access 36 modules of the operating system 24 are activated to decode and process the data extracted from the physical layer frame.

As explained above, the decoding modules that implement the various protocol stacks need not be located on the network adapter 40. In one embodiment of the present invention, the multi-protocol network adapter 40 is implemented as a network interface card. The decoding modules—e.g. traffic decoder 52 and storage decoder 50—can be included on the card or included on the device using the adapter 40. In another embodiment of the present invention, the multi-protocol network adapter is not provided as a separate card or module, but its functionality is absorbed into a device, such as a file server.

While the various embodiments of the present invention have been described in the context of a storage server, the present invention is not limited to storage servers. Other devices, such as routers, switches, storage and network blades, and workstations, can also use a multi-protocol network adapter 40 according to some embodiments of the present invention.

Figure 4:
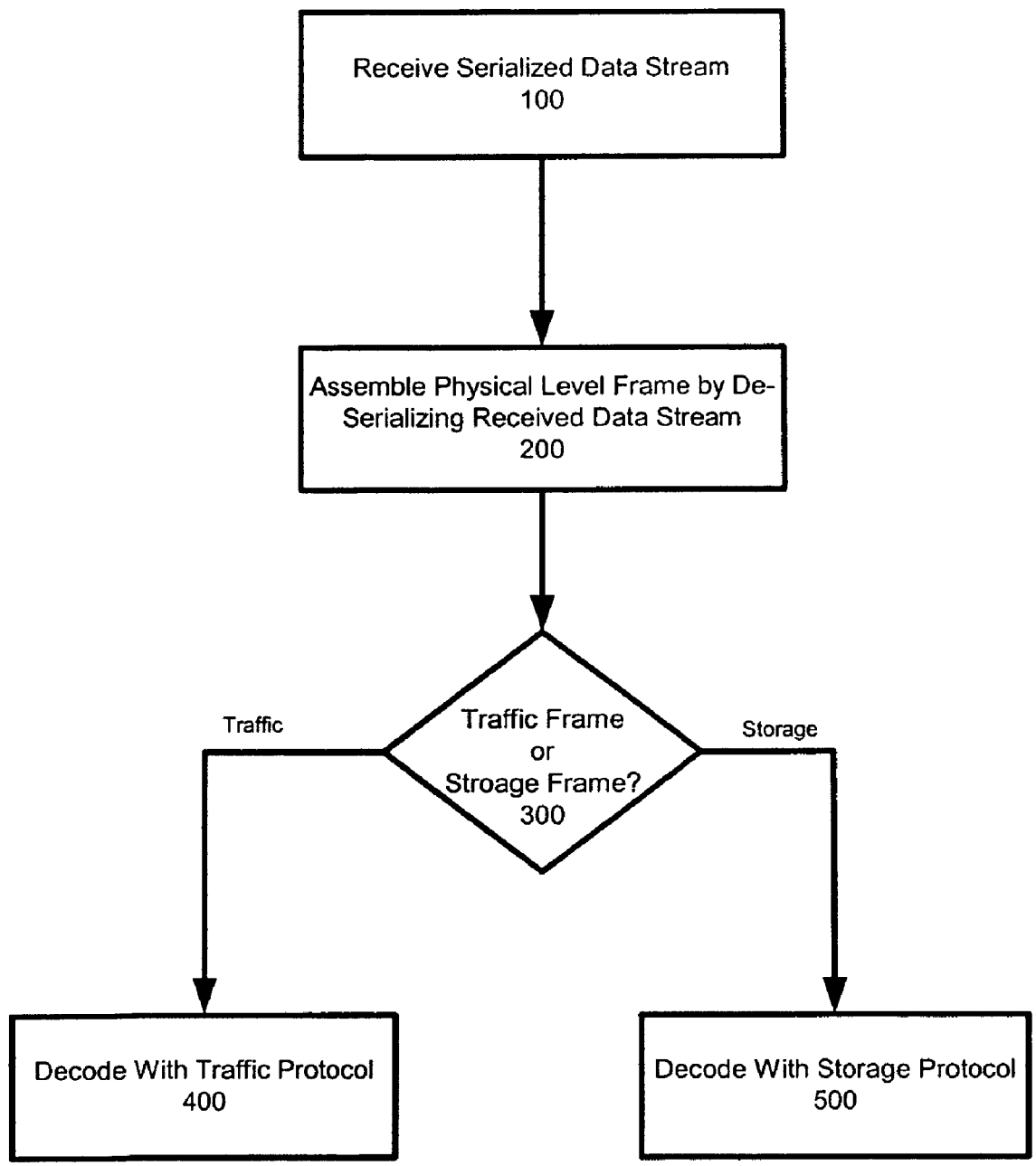
FIG. 4 is a flow diagram illustrating a data receiving processing according to one embodiment of the present invention.

The functionality of the adapter 40 and the protocol identifier 48 may be implemented in hardware or in software. FIG. 4 illustrates a process performed by some device having functionality similar to the adapter 40 according to certain embodiments of the present invention. In block 100, a serialized data stream is received. In block 200, the data stream is de-serialized, and organized into physical layer frames. In one embodiment, no decoding or protocol-specific data manipulation has taken place up to this point.

In block 300, a decision is made as to whether the assembled physical layer frame is a traffic frame or a storage frame. In one embodiment, the physical layer frame is designated a traffic frame if it is identified as having been encoded using a traffic protocol, such as Ethernet. Similarly, in one embodiment, the physical layer frame is designated a storage frame if it is identified as having been encoded using a storage protocol, such as Fibre Channel. In one embodiment, block 300 can be implemented as a primitive comparison; comparing one or more primitives in the physical layer frame with one or more known primitives associated with a traffic and a storage protocol.

If the physical layer frame is determined to be a traffic frame in block 300, then, in block 400, the physical layer frame is decoded using the traffic protocol. Similarly, if the physical layer frame is determined to be a storage frame in block 300, then, in block 500, the physical layer frame is decoded using the storage protocol. The decoding processing need not be implemented on the same physical device as the protocol determination in block 300.

Thus, a multi-protocol network adapter has been described. The techniques introduced above have been described in the context of a NAS environment. However, these techniques can also be applied in various other contexts. For example, the techniques introduced above can be applied in a storage area network (SAN) environment. A SAN is a highly efficient network of interconnected, shared storage devices. One difference between NAS and SAN is that in a SAN, the storage server (which may be an appliance) provides a remote host with block-level access to stored data, whereas in a NAS configuration, the storage server provides clients with file-level access to stored data.

The techniques introduced above are not limited to use in a file server or in a NAS environment. Although the present invention has been described with reference to specific exemplary embodiments, it will be recognized that the invention is not limited to the embodiments described, but can be practiced with modification and alteration within the spirit and scope of the appended claims. Accordingly, the specification and drawings are to be regarded in an illustrative sense rather than a restrictive sense.

What is claimed is:

1. A multi-protocol network adapter comprising:
a port to receive a serialized data stream, the serialized data stream including traffic data packets encoded using a traffic protocol and storage data packets encoded using a storage protocol, wherein the traffic data packets and the storage data packets are separate packets sent over a single network;
a receiver coupled to the port to de-serialize the received data stream;
an input buffer coupled to the receiver to store a physical layer frame assembled from the de-serialized data stream;
a protocol identifier coupled to the input buffer to determine, at a physical level, which of a plurality of protocols the physical layer frame was encoded with, the plurality of protocols including the traffic protocol and the storage protocol; and
a storage decoder coupled to the protocol identifier to decode the physical layer frame using the storage protocol if the physical layer frame is determined by the protocol identifier to have been encoded using the storage protocol.

2. The multi-protocol network adapter of claim 1, further comprising a traffic decoder coupled to the protocol identifier to decode the physical layer frame using the traffic protocol if the physical layer frame is determined to have been encoded using the traffic protocol by the protocol identifier.

3. The multi-protocol network adapter of claim 2, wherein the traffic protocol comprises a Transmission Control Protocol/Internet Protocol (TCP/IP) stack.

4. The multi-protocol network adapter of claim 3, wherein the traffic decoder comprises an Ethernet decoder.

5. The multi-protocol network adapter of claim 1, wherein the storage protocol comprises a Small Computer System Interface (SCSI) stack.

6. The multi-protocol network adapter of claim 5, wherein the storage decoder comprises a Fibre Channel decoder.

7. The multi-protocol network adapter of claim 1, wherein the protocol identifier comprises a primitive comparator configured to compare one or more primitives of the physical layer frame to primitives associated with the traffic and storage protocols.

8. The multi-protocol network adapter of claim 1, wherein the multi-protocol network adapter comprises a network interface card.

9. A method comprising:
receiving a serialized data stream, the serialized data stream including traffic data packets encoded using a traffic protocol and storage data packets encoded using a storage protocol, wherein the traffic data packets and the storage data packets are separate packets sent over a single network;
assembling a first physical layer frame from the data stream;
determining, at a physical level, which of a plurality of protocols the first physical layer frame was encoded with, the plurality of protocols including the traffic protocol and the storage protocol; and
decoding the first physical layer frame using the storage protocol if the physical layer frame is determined to have been encoded using the storage protocol.

10. The method of claim 9, further comprising:
assembling a second physical layer frame from the data stream;
determining which of the plurality of protocols the second physical layer frame was encoded with; and
decoding the second physical layer frame using the traffic protocol if the physical layer frame is determined to have been encoded using the traffic protocol.

11. The method of claim 10, wherein the traffic protocol comprises a Transmission Control Protocol/Internet Protocol (TCP/IP) stack.

12. The method of claim 11, wherein decoding the second physical layer frame comprises decoding the second physical layer frame using an Ethernet decoder.

13. The method of claim 9, wherein the storage protocol comprises a Small Computer System Interface (SCSI) stack.

14. The method of claim 13, wherein decoding the first physical layer frame comprises decoding the first physical layer frame using a Fibre Channel decoder.

15. The method of claim 9, wherein determining whether the first physical layer frame was encoded using the storage protocol comprises comparing one or more primitives of the first physical layer flame to primitives associated with the traffic and storage protocols.

16. A storage server comprising:
a combined network/storage interface coupled to a single traffic/storage network, the network/storage interface configured to receive a serialized data stream including traffic data packets encoded using a traffic protocol and storage data packets encoded using a storage protocol, wherein the traffic data packets and the storage data packets are separate packets;
a receiver coupled to the network/storage interface to de-serialize the received data stream;
an input buffer coupled to the receiver to store a physical layer frame assembled from the de-serialized data stream;

a protocol identifier coupled to the input buffer to determine, at a physical layer, which of a plurality of protocols the physical layer frame was encoded with, the plurality of protocols including the traffic protocol and the storage protocol; and a storage decoder coupled to the protocol identifier to decode the physical layer frame using the storage protocol if the physical layer frame is determined by the protocol identifier to have been encoded using the storage protocol.

17. The storage server of claim 16, further comprising a traffic decoder coupled to the protocol identifier to decode the physical layer frame using the traffic protocol if the physical layer frame is determined to have been encoded using the traffic protocol by the protocol identifier.

18. The storage server of claim 17, wherein the traffic protocol comprises a Transmission Control Protocol/Internet Protocol (TCP/IP) stack.

19. The storage server of claim 18, wherein the traffic decoder comprises an Ethernet decoder.

20. The storage server of claim 16, wherein the storage protocol comprises a Small Computer System Interface (SCSI) stack.

21. The storage server of claim 20, wherein the storage decoder comprises a Fibre Channel decoder.

22. The storage server of claim 16, wherein the protocol identifier comprises a primitive comparator configured to compare one or more primitives of the physical layer frame to primitives associated with the traffic and storage protocols.

\* \* \* \* \*